Sept. 3, 1946. A. L. LANGEL 2,407,021
MUTIPLE BAKING PAN
Filed Dec. 4, 1943 3 Sheets-Sheet 1
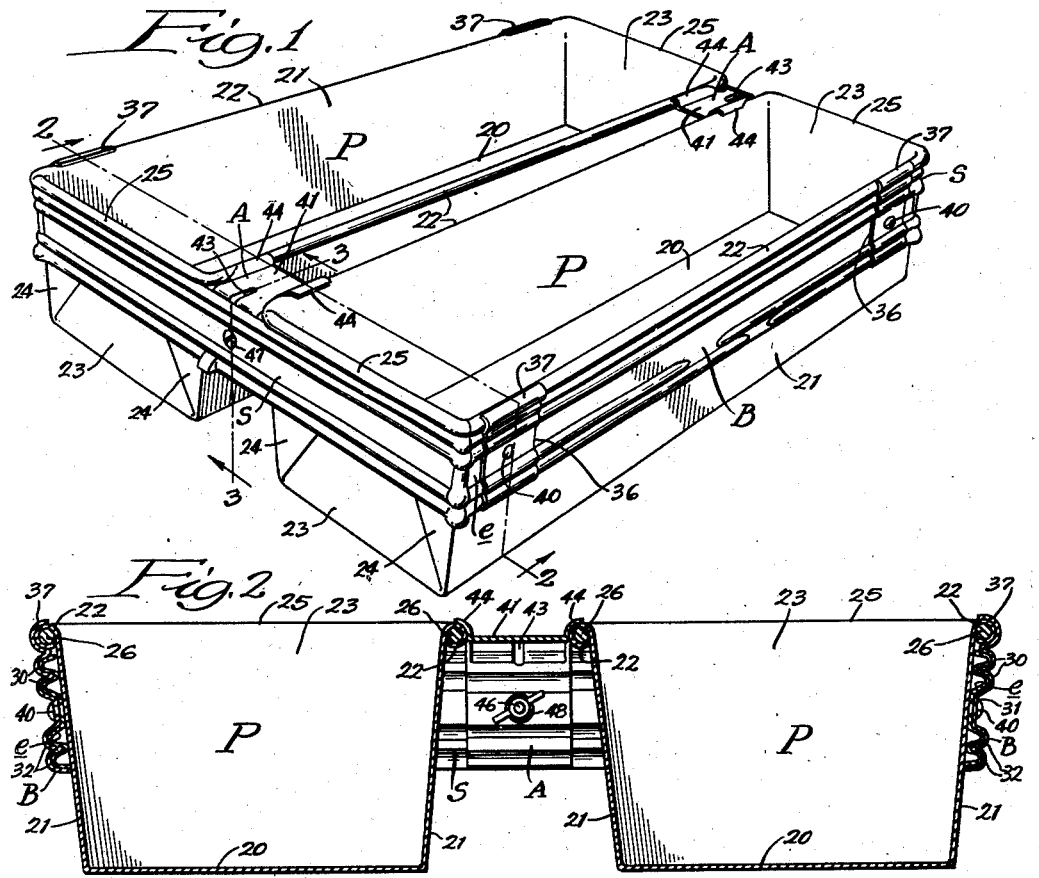
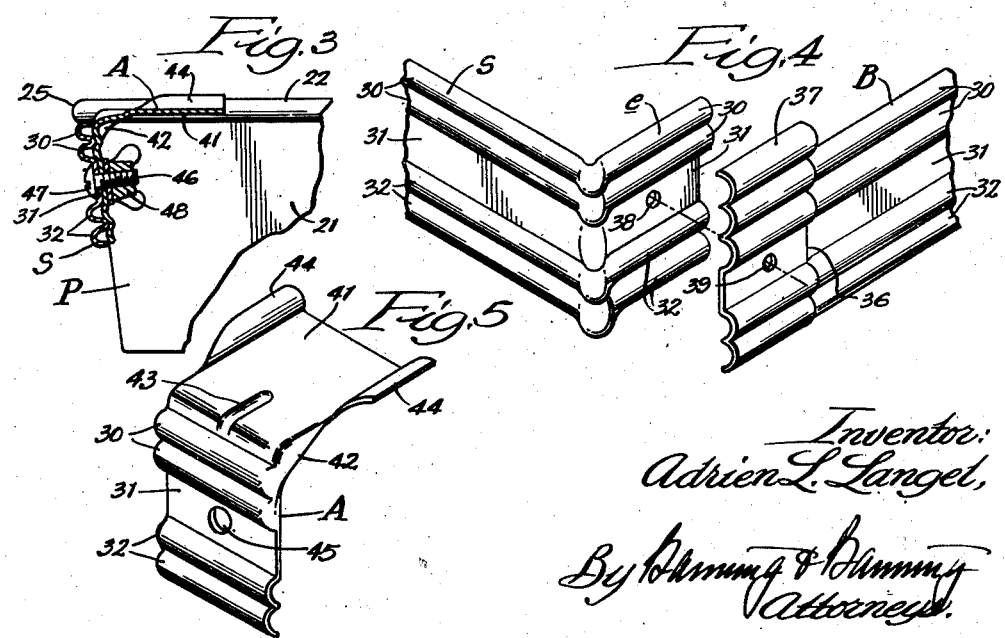
Inventor:
Adrien L. Langel,
By Banning & Banning
Attorneys.

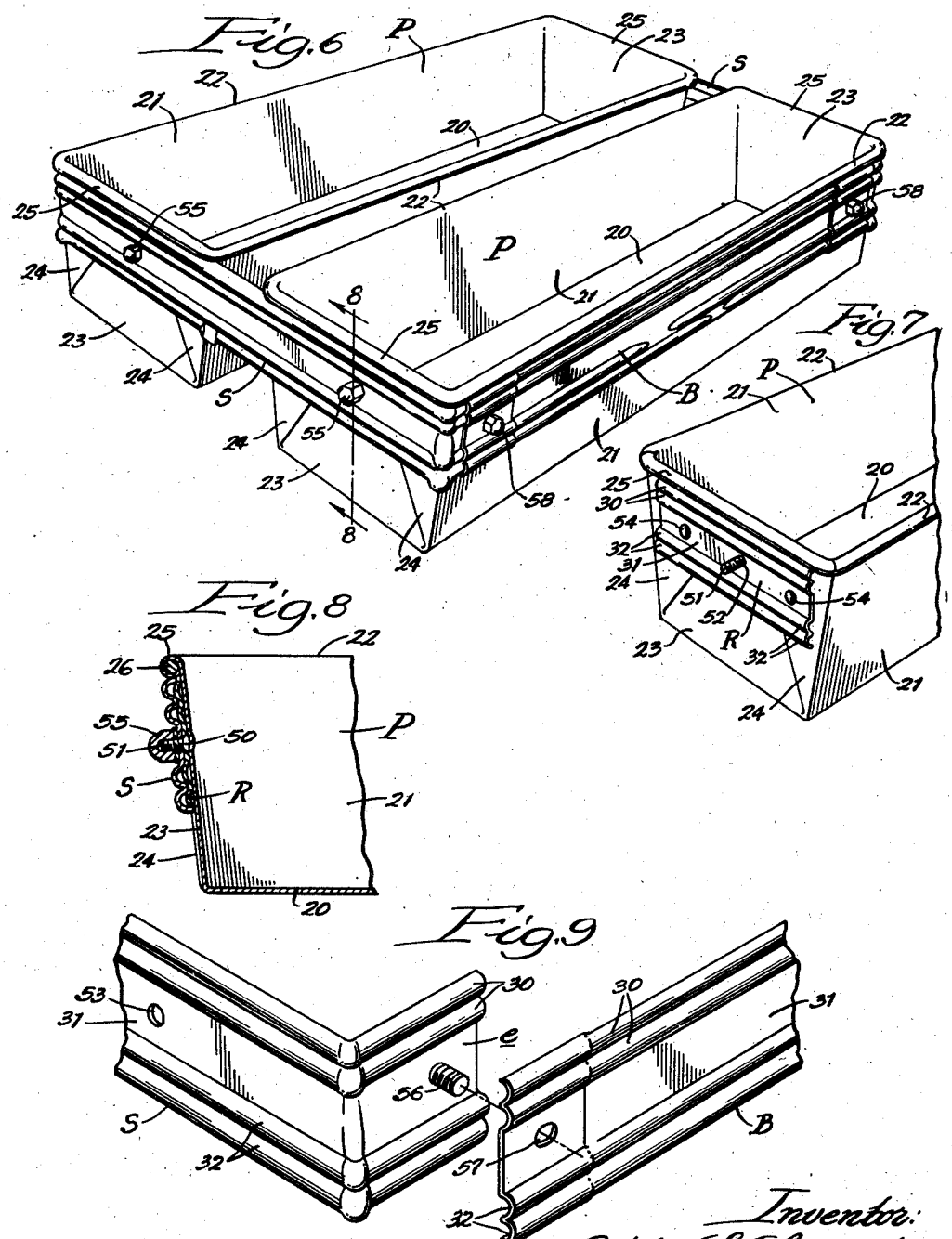

Sept. 3, 1946.  A. L. LANGEL  2,407,021
MUTIPLE BAKING PAN
Filed Dec. 4, 1943  3 Sheets-Sheet 3
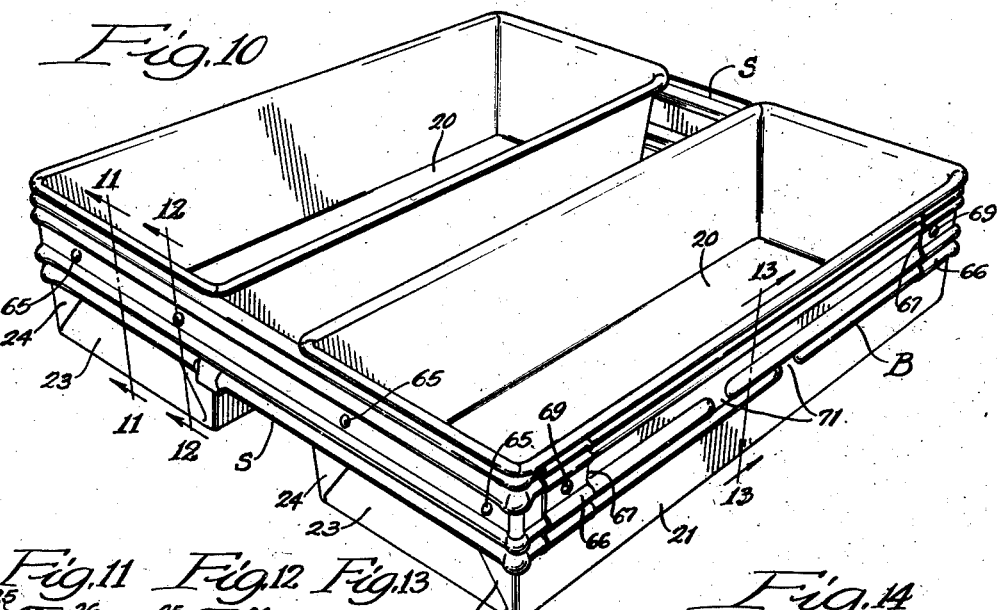
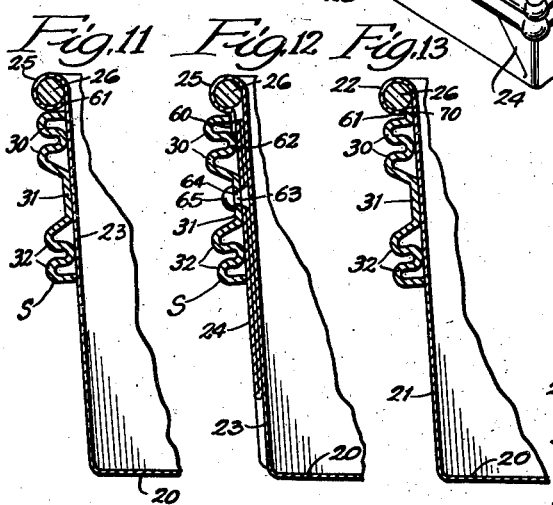
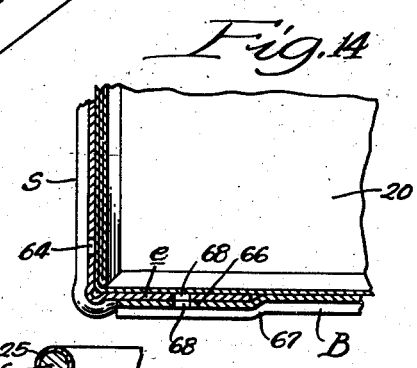
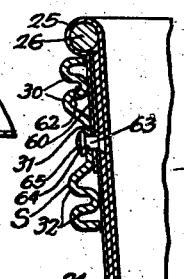
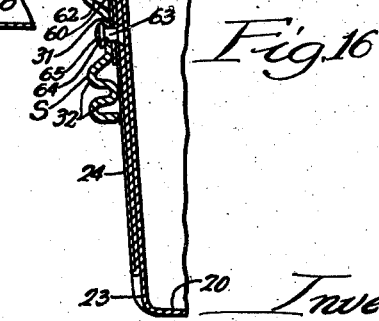
Inventor:
Adrien L. Langel,
By Flemming & Flemming
Attorneys.

UNITED STATES PATENT OFFICE 2,407,021

MULTIPLE BAKING PAN

Adrien L. Langel, Chicago, Ill., assignor to Chicago Metallic Manufacturing Company, Chicago, Ill., a corporation of Illinois Application December 4, 1943, Serial No. 512,877

1 Claim. (Cl. 220—23.2)

The present improvements relate generally to multiple baking pans, i. e., a plurality of like pans which are fixedly united into a set for convenience in handling and use. More particularly I am here concerned with the means by which the pans are interconnected in a fixed unitary relation. Such means is in the form of a rectangular frame comprising straps extended lengthwise along the pan set, also bands at the ends thereof, together with means for interconnecting the straps and bands and the supported pans. In addition, my invention is concerned with certain improvements in these several parts, with the connections therebetween by which a disassembly may take place to permit substitution of new for old or damaged parts, and with a locking element which is fitted between adjacent pans in a manner whereby to maintain them always a fixed distance apart.

These several features of construction afford various advantages in the direction of strength, economy, simplicity and durability, all as will hereinafter appear, certain suggestive embodiments thereof being illustrated in the accompanying drawings in the manner following:

Figure 1 is a perspective view of a pan set which utilizes a supporting frame embodying my invention in one of its forms; Fig. 2 is a transverse section through the pan set, taken on line 2—2 of Fig. 1; Fig. 3 is a detail in section, taken on line 3—3 of Fig. 1; Fig. 4 is a fragmentary perspective view of the meeting ends, shown slightly separated, of two of the frame members; Fig. 5 is a view in perspective of a stay that is fitted in place between adjacent pans in the set;

Figure 6 which is a similar view shows a pan set in which the supporting frame is differently constructed; Fig. 7 is a fragmentary perspective view looking toward a pan end to which is fitted a reinforcing plate; Fig. 8 is a vertical section, taken on line 8—8 of Fig. 6; Fig. 9 is a fragmentary view in perspective of the meeting ends, shown slightly separated, of two of the frame members as illustrated in Fig. 6;

Figure 10 is a perspective view of two pans united into a set by a supporting frame of modified construction; Figs. 11, 12 and 13 are enlarged sectional details taken, respectively, on lines 11—11, 12—12 and 13—13 of Fig. 10; Fig. 14 is a detail in horizontal section at one of the joints between two of the frame members which are fashioned according to Fig. 10; Fig. 15 is a perspective view of the meeting ends, shown slightly separated, of two of the frame members as illustrated in Fig. 10; and Fig. 16 which is an enlarged detail taken in the plane of line 12—12 of Fig. 10 shows a construction in which is incorporated another modification of my invention.

In the showing of Fig. 1, two pans P are combined into a set to be handled as a unit. These pans which are alike comprise in each instance a sheet metal bottom 20 from opposite edges of which rise sides 21 which along their upper edges 22 are curled outwardly, downwardly, and then inwardly (see Fig. 2) to provide a marginal bead. Also rising from other opposite edges of the pan bottom are ends 23 with triangular, two-ply wings 24 representing excess of material folded over to lie against the pan ends whose upper edges 25 are also curled outwardly, downwardly, and then inwardly to provide a marginal bead in continuation of those along the top edges of the pan sides. Within the beaded edges of the pan is desirably secured a reinforcing wire 26. Both the side and end walls may be inclined outwardly to a slight extent to facilitate nesting of one pan set with another.

The means by which several pans may be united into a set, with the pan end walls aligned to form the sides of the pan unit, is a rectangular supporting frame comprising a pair of straps S, one extended along each side of the pan set, together with a pair of bands B, one extended along each end of the pan set. Each strap is bent longitudinally upon itself to form a pair of outwardly protruded ribs 30 extending above a central web 31 below which is another pair of outwardly protruded ribs 32. The upper and lower strap edges are extended toward the pan ends so as to lie substantially in engagement therewith or with the wings 24.

Each strap S is turned through 90° or so at its ends to provide, in effect, ears e which extend around the corners of the pan set and lap upon the ends thereof for a short distance (see Fig. 4). The contour of the ears may be the same as the remainder of the strap, i. e., the two separated pair of ribs 30 and 32 may be continued through to the ends of the strap. These ears underlie the ends of a band B one of which is extended along each end of the pan set. As shown in Fig. 4, the band is formed for most, if not all, of its length with a cross-sectional contour substantially the same as the strap so that like parts thereof bear corresponding reference characters. The band ends, however, are for the short distance which underlies the ears e outset to provide vertical shoulders 36 which lie opposite and adjacent the end edges of the strap ears. In addition, each outset band end is upwardly extended to form a shield 37 concave for partial embracement of the pan edge (see Fig. 2). Formed through the webs 31 of the strap and band, at a point of overlap, are registering holes 38 and 39, respectively, for receiving a fastener, such as a rivet 40. In this way each band is interfitted with and locked to the underlapping ears of the two straps which extend along opposite ends of the pan set to provide therefor a unitary supporting frame.

The length of the straps and bands is desirably such as to provide a frame which will accommodate a plurality of pans arranged in a row with a definite spacing between adjacent pans. To assemble the pans into a set, first one and then another is fitted into the frame and slid therein to an endwise position for embracing engagement by the band shields 37 at opposite ends of the frame. If the frame be sized for reception of a third (or a fourth) pan as well, the latter will then be fitted in place between the others in spaced relation thereto. The reinforced edges at the pan ends stand out sufficiently to rest upon the top edges of the straps S which accordingly furnish vertical support therefor. To lock the pans immovably in the frame, a pair of stays A is fitted into each space between two adjacent pans. Each stay, best illustrated in Fig. 5, may take the general form of an angle having a horizontal ledge 41 from which depends a tongue having horizontal bends which form upper and lower pairs of ribs 30 and 32 separated by a web 31 corresponding in contour and position to those of the strap. To rigidify the structure, bracing webs 42 are shown as cutting across the corner between the ledge and tongue of the stay, and if desired a stiffening rib 43 may also be formed on the ledge, as shown. The bracing webs may continue upwardly above the ledge to provide along its opposite side edges concave flanges 44 which face outwardly in position to partially embrace the proximate side edges of the adjacent pans (see Fig. 2). A hole 45 is formed through the web 31 of the tongue in register with a hole in the strap S, both to receive a bolt 46 whose head 47 bears against the outer face of the strap S. The threaded shank of this bolt is fitted with a cooperating nut 48 adapted to bear against the inner face of the tongue web 31. With a pair of stays secured in place between adjacent pans, one at each end thereof, the pans are locked to each other and to the frame in unitary relation. In case of damage to any pan, however, disassembly may readily be performed, starting with removal of the necessary bolts, stays and pan (or pans), substitution of another pan (or pans) in good order, and ending with replacement of the locking stays.

Turning now to Figs. 6–9. I have illustrated two pans which are united into a set within a frame that in many respects (as indicated by corresponding reference characters) is the same as the construction already described. The band B, however, is minus any top shield, and in lieu of the stay I employ at each pan end a short reinforcing plate R (see Fig. 7) having a longitudinally ribbed contour substantially the same as that of the strap S. The rear face of this plate rests against the pan wings 24 between which is a space sufficient to accommodate the head 50 of a bolt 51 which is extended outwardly through a hole 52 in the plate and through a registering hole 53 in the strap. To support the reinforcing plate upon the associated pan end I may employ a pair of fasteners, such as rivets 54, each passing through a pair of registering openings in the plate and on to the wings to the rear thereof.

To assemble the frame and pans therewithin, as set forth in Figs. 6–9, I first affix the reinforcing plates with bolts 51 mounted therein to the pan ends, then interconnect the pans with a pair of straps S through which the bolts 51 are protruded for reception upon their outer ends of nuts 55 (such as the cap nuts shown). The straps when so connected to the pan become interlocked with the reinforcing plate (or plates) R by reason of their registering contours, and the upper strap edges become engaged with the under side of the outstanding reinforced pan edges at the ends thereof. At the strap ends other bolts 56, carried by the turned ears e, are extended outwardly for reception through holes 57 in the band ends. To the ends of these bolts nuts 58 (here shown as cap nuts) may be applied whereby to complete interconnection of the straps and bands for the frame. In this construction it will be noted that each pan carries a pair of reinforcing plates (one at each end), that the straps are then connected to these plates and thereby to the pans, and that the bands are connected to the straps at the turned ends of the latter. For these several connections bolts may be utilized, each mounted fixedly in place with its head end concealed and its opposite end outwardly extended to position for convenient application thereto of a nut with which may be optionally associated a lock washer, as shown. Such a frame and mounting of pans therewithin may be readily disassembled by removal of the nuts and disconnecting of the parts, whenever it is desired to replace a damaged pan with one that is in good order.

The strap S and band B, shown in Figs. 10–16, are modified slightly from those already described, but in respect of features which are the same they carry the same reference characters. As here shown, the pan ends comprise triangular two-ply wings 24 representing excess of material folded over to lie against the pan ends, and at points opposite these wings the curled pan edges are turned down in the form of skirts 60 to partially overlie the wings (see Figs. 12 and 16). Elsewhere, as between these wings (see Fig. 11), these edges terminate in lips 61 on the under side of the reinforcing wire adjacent the pan ends, these laps, if desired, stopping short of the pan walls to leave a narrow gap for reception of the upper edge of the strap or band, as will shortly be explained.

Each strap S, as shown in Figs. 10–16, is of single ply, formed with a pair of outwardly protruded ribs 30 extending longitudinally above a central web 31 below which is another pair of outwardly protruded ribs 32. The upper and lower strap edges are extended toward the pan ends so as to lie substantially in engagement therewith (see Fig. 11) and with the depending skirts 60 (see Figs. 12 and 16), the base 62 between the upper ribs being outset sufficiently to accommodate the skirts therebehind. As by means of rivets 63 which are extended through holes 64 in the strap web and the pan wings 24 the several pans may be connected together as a unit, the upset rivet ends 65 then lying in a sunken position so as to receive protection from the protruding ribs above and below. In the showing of Fig. 16 the skirt 60 is depended a sufficient distance to lie intermediately of the strap web 31 and pan wings 24 therebehind, and is also apertured to receive the rivets 63 so that this fastening element positively locks the skirt in its downturned position whereby to effectively oppose any movement thereof particularly in the region of its curl around the reinforcing wire 26.

Each strap S is turned through 90° or so near its ends to provide, in effect, ears e which extend around the corners of the pan set and lap upon the ends thereof for a short distance. The contour of the ears may be the same as the remainder of the strap, i. e., the upper and lower pair of ears with intervening web may be continued through to the ends of the strap. These ears underlie opposite ends of the band B one of which is extended along each end of the pan set. As best shown in Fig. 13, the band is formed with a cross sectional contour substantially the same as the strap. The end portions 66 of the band are outset for the short distance which overlies the strap ears e (see Figs. 14 and 15) whereby to provide vertical shoulders 67, and both the strap and band, in each region of overlap, are formed with registering holes 68 through which may be entered rivets 69 which interconnect these several parts immovably and securely. The top edge of the band is optionally upturned, as at 70, for extension through the gap opposite the pan lips 61 (see Fig. 13) so as to engage within the crotch formed between the reinforcing wire 26 and the adjacent pan side wall 21. In this way a continuous line of interconnection may be provided between the band top edge and the exposed side wall of the outermost pan in the set whereby to reinforce the protection that is afforded to the set in its entirety. As shown in Fig. 10, continuity of the lower pair of band ribs may be interrupted as at 71, such points of interruption being staggered to avoid weakness in any appreciable degree. The gaps so provided by breaks in the ribs will facilitate removal of particles and drainage of water when an external cleaning operation is to be performed.

The features of invention herein disclosed are particularly advantageous with a multiple baking pan that is subjected to hard and continuous use. The spaced pairs of reinforcing ribs along the straps provide between them a sunken area in which the nuts or upset ends of connecting rivets are normally protected from contact with external objects. The bolt or rivet connections are also readily accessible in case any repairs become necessary. Also the lowermost rib terminates in a strap edge which is adapted to abut the ends of the several pans thereby resisting effectively any pressure which otherwise might tend to crush the ribs. The uppermost rib of each strap is furthermore positioned adjacent the under side of the outturned reinforced pan edges and cooperates therewith in protecting the pans from injury along this vulnerable point. Each strap may, in fact, cooperate with the skirts depending from the upper edges of the pan walls to maintain them closely against the reinforcing wires around which they are curled so as to prevent any separation of such edges from the pans themselves.

The ribbed construction of frame members, i. e., the straps and bands, imparts strength in an unusual degree to the constructions herein disclosed. This is so not only because the ribs are effective to resist denting from an external impact, but due to their interfitting with each other at the several points of inter-connection. A frame having these features of construction is sturdy and sufficiently rigid to furnish a secure mounting for pans which are removably affixed in place therewithin. Sufficient bracing is afforded by the locking stays which occupy positions between adjacent pans or by the reinforcing plates which, when affixed to the pan ends, serve as mediums of connection between the pans and the supporting frame therefor. Accordingly, the entire structure possesses the advantage of strength and protection for the pans comprising the set, and may also embody the feature of removability of the pans themselves.

I claim:

A baking pan set consisting of a plurality of aligned pans having at the wall edges thereof wires forming beads around which certain of the wall edges are curled and then depended in the form of skirts lying adjacent the exterior of the pan walls, the pan walls including an exteriorly disposed wing to the inside of each skirt, a strap extending lengthwise of the pan set along the outside of the skirts, and fastening devices piercing the strap, skirts and wings and interconnecting said strap, skirts and wings in a straight line, said strap being formed longitudinally with a narrow central web in flat engagement with the pan walls and a pair of outwardly extended ribs below the web in engagement with the pan walls in two separated substantially parallel lines of contact, and a second pair of outwardly extended ribs above the web also in engagement with the pan walls in two other separated substantially parallel lines of contact, the central web of narrow width affording the only surface of substantial area in engagement with the pan walls and the connections with the several pans being confined to this same area, the strap being turned substantially at right angles near its two ends to provide ears for partially overlapping the outer sides of the end pans, and a pair of bands extended along opposite sides of the end pans, each formed longitudinally with a narrow central web in flat engagement with the pan walls and a pair of outwardly extended ribs below the web in engagement with the pan walls in two separated substantially parallel lines of contact and a second pair of outwardly extended ribs above the web also in engagement with the pan walls in two other separated substantially parallel lines of contact, said bands being outset in their end regions for overlap with the strap ears and secured to the same in meshing engagement therewith, the narrow web and line contacts of the strap and bands providing minimum contact between the pans and the strap and bands and preventing temperature lag in the pans when the latter are subjected to heat.

ADRIEN L. LANGEL.